UNITED STATES PATENT OFFICE.

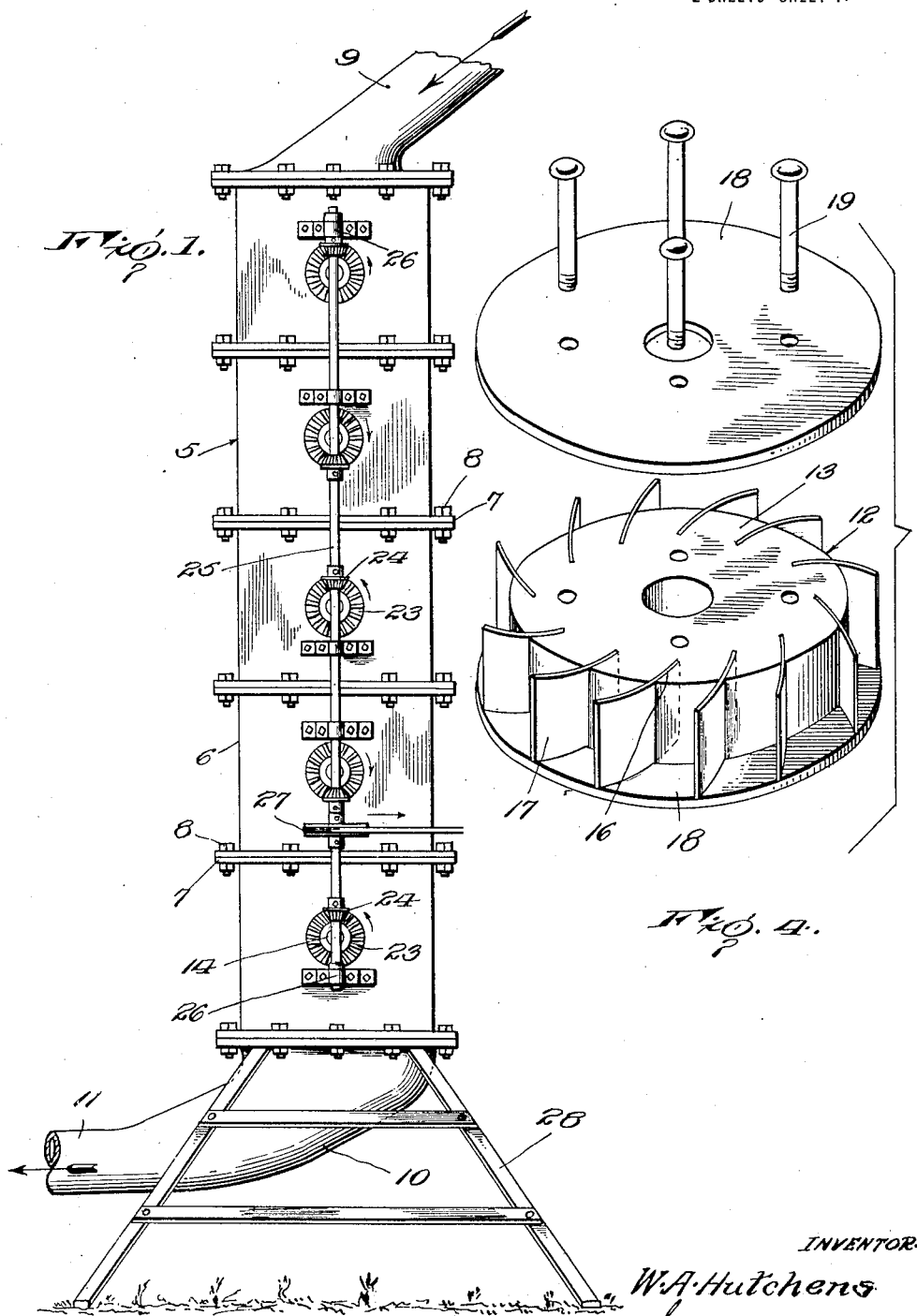

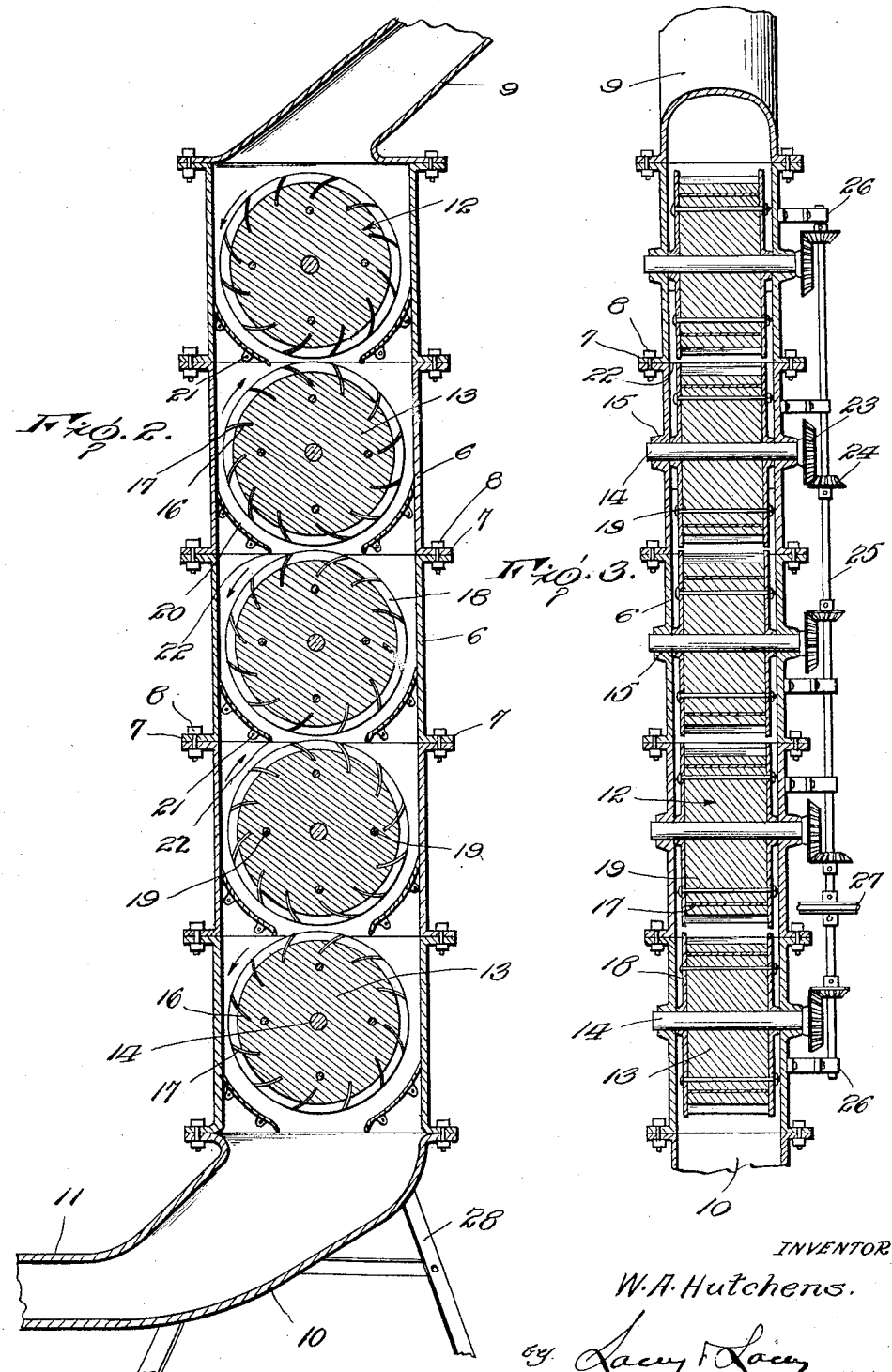

WILLIAM ART HUTCHENS, OF YADKINVILLE, NORTH CAROLINA.

SECTIONAL OVERSHOT WATER-WHEEL.

1,331,110.  Specification of Letters Patent. Patented Feb. 17, 1920.

Application filed April 12, 1919. Serial No. 289,568.

*To all whom it may concern:*

Be it known that I, WILLIAM ART HUTCHENS, a citizen of the United States, residing at Yadkinville, in the county of Yadkin and State of North Carolina, have invented certain new and useful Improvements in Sectional Overshot Water-Wheels, of which the following is a specification.

This invention relates to hydraulic power plants and has for its object to provide means whereby power generated by a gang of over-shot water wheels may be utilized for driving machinery or performing other useful work.

The invention further aims to provide a water power plant including a casing having a plurality of superposed over-shot water wheels mounted for rotation therein and operatively connected with a driving shaft, means being provided for transmitting motion from the water wheels to the shaft and for connecting said shaft to the machinery to be operated.

The invention further contemplates constructing the casing in sections so that the same may be readily detached or separated to permit access to any desired water wheel for the purpose of effecting repairs thereto without the necessity of entirely dismantling the device.

A further object is to provide means at one end of the casing for directing the water against the blades of the upper wheel and means at the opposite ends of said casing for discharging the water, there being suitable plates or deflectors disposed within the casing beneath each wheel for directing the flow of water alternately against the blades of the several wheels.

A still further object is generally to improve this class of devices so as to increase their utility, durability and efficiency.

In the accompanying drawings:

Figure 1 is a side elevation of a hydraulic power plant embodying the present invention;

Fig. 2 is a longitudinal sectional view thereof;

Fig. 3 is a transverse sectional view;

Fig. 4 is a perspective view of one of the over-shot water wheels removed from the casing, one of the side plates of the wheel being detached in order to show the construction of said wheel.

Corresponding and like parts are referred to in the following description and indicated in all the views of the drawings by the same reference characters.

The improved hydraulic power plant forming the subject matter of the present invention comprises an elongated casing 5 preferably formed of a plurality of separable sections 6 having laterally extending flanges 7 provided with registering openings for the reception of bolts or similar fastening devices 8 by means of which the casing sections may be rigidly secured in assembled position. Detachably secured to the upper end of the casing is an inclined nozzle 9 which may be connected with a raceway flume, or other source of water supply for the purpose of directing the water from said supply into the casing, there being an auxiliary casing 10 disposed at the lower end of the casing 5 and terminating in a nozzle 11 through which the water is discharged after its passage through the main casing. Mounted for rotation within the casing 5 are a plurality of superposed over-shot water wheels indicated at 12, one of said water wheels being preferably disposed within each casing section 6, as shown. Each water wheel comprises a hub 13 rigidly secured to a transverse shaft 14 journaled in suitable bearings 15 formed in the side walls of the adjacent section casing, there being tangential slots 16 formed in the periphery of the hub and in which are seated blades or paddles 17. Secured to the hub 13 of each water wheel are spaced plates or disks 18 the peripheral edges of which preferably project slightly beyond the periphery of the adjacent hub 13 so as to form intermediate pockets for the water as the latter passes through the casing. The plates 18 are secured to the hub 13 preferably by bolts or similar fastening devices 19. Arranged immediately below each of the water wheels 12 are inwardly and downwardly inclined plates 20 provided with attaching ears 21 and having their lower ends curved downwardly as indicated at 22, said plates serving to deflect or direct the water onto the adjacent water wheels.

One end of each shaft 14 is preferably extended longitudinally beyond the adjacent bearing 15 to form a support for a bevel gear 23 which meshes with a correspondingly shaped pinion 24 keyed or otherwise secured to a vertical shaft 25. The shaft 25 is journaled in upper and lower bearings 26 preferably secured to the exterior of the casing and is provided with a belt wheel or pulley 27 from which power may be transmitted for the purpose of operating machinery or the like. It will here be noted that the blades of one water wheel are reversely inclined with respect to the blades of an adjacent wheel and that the water in its passage through the casing is alternately directed from one side thereof to the other and against the blades of the several wheels. It will also be noted that the pinions 24 are alternately arranged above and below the adjacent bevel gears 23 so that when the water wheels are rotated power will be transmitted from said water wheels through the medium of the gearing to the vertical shaft 25 and rotate said shaft continuously in one direction. If desired, the casing 5 may be mounted on a suitable supporting frame 28 in which event the auxiliary casing 10 and discharge nozzle 11 will project laterally through one side thereof, as best shown in Fig. 1 of the drawings. It will be understood, however, that if desired the casing 5 may be supported directly on the ground or an especially prepared foundation may be constructed to support said casing and its associated parts.

In operation water entering the casing through the nozzle 9 will be directed against the blades 17 of the upper water wheel 12 and rotate the same, the water after it leaves the upper wheel being directed against the blades 17 of the next wheel and so on throughout the entire series or gang of wheels, each wheel transmitting its power through the medium of its shaft and gearing to the vertical shaft 25 and thence through the belt and pulley 27 to the place of use, as before stated.

Inasmuch as each of the casing sections is complete in itself, that is to say each provided with a water wheel and oppositely disposed deflectors, as many of said casing sections may be assembled as desired thereby increasing or decreasing the capacity of the plant at will. It will, of course, be understood that the casing instead of being made in sections may be of integral formation and that the intake nozzle 9 and discharge nozzle 10 may be dispensed with without departing from the spirit of the invention. It will furthermore be understood that the casing sections and water wheels may be made in different sizes and shapes and said water wheels provided with any desired number of blades.

Having thus described the invention, what is claimed as new is:

1. A hydraulic power plant including a casing, a plurality of over-shot water wheels mounted for rotation one above the other within the casing, oppositely disposed deflectors interposed between the water wheels for directing the water downwardly from one wheel to the other, a vertical shaft journaled on the outside of the casing, means for transmitting motion from the water wheels to the shaft, and means mounted on the shaft for transmitting power therefrom.

2. A hydraulic power plant including a casing, a plurality of over-shot water wheels mounted for rotation one above the other within the casing, a nozzle arranged at the upper end of the casing for delivering water thereto, oppositely disposed downwardly inclined plates interposed between the several water wheels for directing the water against the adjacent water wheels, a shaft journaled on the exterior of the casing, means for transmitting motion from the water wheels to the shaft, and means secured to the shaft for transmitting power therefrom.

3. A hydraulic power plant including a plurality of detachably connected superposed casing sections, an over-shot water wheel mounted for rotation within each casing section, downwardly inclined deflectors carried by each casing section, bearings secured to the exterior of certain of the casing sections, a shaft journaled in said bearings, means for transmitting motion from the water wheels to the shaft, and means mounted on the shaft for transmitting power therefrom.

4. A hydraulic power plant including a sectional casing, over-shot water wheels mounted for rotation within the casing, a water supply nozzle arranged at the upper end of the casing, a discharge nozzle communicating with the interior of the casing at the lower end thereof, oppositely disposed downwardly inclined plates secured to each casing section immediately below the adjacent water wheel, a horizontal shaft forming a part of each water wheel and provided with a bevel gear, a vertical shaft having bevel pinions secured thereto and meshing with the adjacent bevel gears, and means mounted on the shaft for transmitting power therefrom.

5. A hydraulic power plant including a casing, a plurality of superposed water wheels mounted for rotation in opposite directions within the casing, means for directing water into the casing, deflectors arranged within the casing for deflecting the water flowing through said casing against the adjacent water wheels, a bevel gear secured to each water wheel, a shaft journaled on the outside of the casing, and bevel pinions secured to the shaft and alternately engaging the upper and lower portions of the bevel gears for transmitting motion from the water wheels and rotating the shaft continuously in one direction.

6. A hydraulic power plant including a casing, a plurality of over-shot water wheels mounted for rotation within the casing and each including a hub having peripheral recesses formed therein, blades seated in said recesses, disks secured to the opposite faces of the hubs and bearing against the adjacent blades, a shaft extending through the hub of each water wheel and provided with a bevel gear, a vertical shaft disposed on the exterior of the casing, pinions secured to the shaft and engaging the adjacent bevel gears for rotating the shaft continuously in one direction, and means mounted on the shaft for transmitting power therefrom.

7. A hydraulic power plant including a supporting base, a plurality of superposed casing sections mounted on the supporting base and each provided with laterally extending flanges, fastening devices extending through said flanges for securing the casing sections in assembled position, a water supply nozzle secured to the top of the casing, an auxiliary casing having a nozzle extending through one side of the supporting frame, an over-shot water wheel mounted for rotation between the walls of each casing section, oppositely disposed downwardly inclined plates secured to each casing section beneath the adjacent water wheel and having laterally extending attaching ears and downwardly curved terminals, bearing blocks secured to the exterior of the casing, a vertical shaft journaled in said bearing blocks, means for transmitting motion from the water wheels to the vertical shaft, and means mounted on the shaft for transmitting power therefrom.

In testimony whereof I affix my signature.

WILLIAM ART HUTCHENS. [L. S.]